(12) United States Patent
Hongo

(10) Patent No.: US 11,868,123 B2
(45) Date of Patent: Jan. 9, 2024

(54) ABNORMALITY DIAGNOSTIC DEVICE FOR FEED AXIS MECHANISM

(71) Applicant: OKUMA CORPORATION, Niwa-Gun (JP)

(72) Inventor: Takumi Hongo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/659,872

(22) Filed: Apr. 20, 2022

(65) Prior Publication Data
US 2022/0350322 A1    Nov. 3, 2022

(30) Foreign Application Priority Data

Apr. 28, 2021  (JP) .................................. 2021-076681

(51) Int. Cl.
```
G05B 23/02      (2006.01)
B23Q 17/00      (2006.01)
G05B 19/404     (2006.01)
B23Q 17/12      (2006.01)
B23Q 5/40       (2006.01)
```
(52) U.S. Cl.
CPC ........... *G05B 23/0235* (2013.01); *B23Q 5/40* (2013.01); *B23Q 17/007* (2013.01); *B23Q 17/008* (2013.01); *B23Q 17/12* (2013.01); *G05B 19/404* (2013.01)

(58) Field of Classification Search
CPC .. G05B 23/0235; G05B 19/404; G05B 19/19; G05B 19/37534; G05B 2219/50197; G05B 2219/37435; G01M 13/028; G01M 13/02; F16H 2025/2075; F16H 25/2214; F16H 57/0006; F16H 25/24; H02P 29/024; B23Q 17/12; B23Q 17/008; B23Q 5/40; B23Q 17/00; B23Q 17/007
See application file for complete search history.

(56) References Cited

U.S. PATENT DOCUMENTS

| | | | |
|---|---|---|---|
| 9,429,936 B2 | 8/2016 | Iijima et al. | |
| 11,242,919 B2 | 2/2022 | Honjo et al. | |
| 2012/0014631 A1* | 1/2012 | Huang | F16H 57/01 384/446 |
| 2021/0164546 A1* | 6/2021 | Honjo | F16H 25/24 |
| 2022/0099526 A1* | 3/2022 | Matsumura | F16H 25/22 |

FOREIGN PATENT DOCUMENTS

| | | |
|---|---|---|
| JP | 2016-034224 A | 3/2016 |
| JP | 2019-105317 A | 6/2019 |

* cited by examiner

*Primary Examiner* — Yoshihisa Ishizuka
*Assistant Examiner* — Carter W Ferrell
(74) *Attorney, Agent, or Firm* — BURR PATENT LAW, PLLC

(57) ABSTRACT

An abnormality diagnostic device for a feed axis mechanism diagnoses an abnormality occurrence and an abnormal portion of the feed axis mechanism. The feed axis mechanism transmits a rotation of a motor to a ball screw coupled by a coupling to rotate the ball screw. The abnormality diagnostic device includes a resonance frequency measuring unit and a diagnosis unit. The resonance frequency measuring unit measures a resonance frequency at a plurality of stroke positions within a stroke range of the feed axis mechanism. The diagnosis unit identifies the abnormal portion based on a relationship between the stroke positions and change amounts relative to a standard value of the measured respective resonance frequencies.

4 Claims, 5 Drawing Sheets

ABNORMALITY DIAGNOSTIC DEVICE FOR FEED AXIS MECHANISM

This application claims the benefit of Japanese Patent Application Numbers 2021-076681 filed on Apr. 28, 2021, the entirety of which is incorporated by reference.

BACKGROUND

1. Technical Field

The disclosure relates to an abnormality diagnostic device for diagnosing an abnormality of a feed axis mechanism mounted on a machine tool and an abnormal portion of the feed axis mechanism.

2. Related Art

Some machine tools are equipped with a feed axis mechanism constituted of a servomotor, a coupling, a support bearing, and a ball screw. In the machine tool equipped with the feed axis mechanism, when an unanticipated failure occurs, an unplanned loss is caused, and thus, it is required to detect a sign before occurrence of a failure. In detecting a sign of a failure, it is also required to identify an abnormal portion that causes the occurrence of the failure in order to solve the failure.

In the feed axis mechanism of the machine tool, a method where a rotational motion of a motor is transmitted to a ball screw to rotate it, and a moving body is moved along a guide device is often used. Then, as a method for diagnosing whether or not the operation of the feed axis mechanism is normal, a method using a resonance frequency is proposed.

For example, JP 2016-34224 A discloses an abnormality diagnostic method that detects a resonance frequency by a control device controlling a servomotor for driving a machine tool, calculates rigidity based on the resonance frequency, and notifies things to be inspected based on the calculation result.

JP 2019-105317 A discloses a failure diagnosis system that detects a failure accompanied by a pre-load decrease of a ball screw. The detection is performed based on a combination of an axial resonance frequency of a predetermined mechanical construct including a ball screw unit and a motor, and a position of a nut member in a screw shaft corresponding to the resonance frequency, when the screw shaft is rotatably driven by the motor.

In a feed axis mechanism constituted of components such as a servomotor, a coupling, a support bearing, a ball screw, the resonance frequency comprehensively reflects a whole component of a feed axis system. Accordingly, in addition to a pre-load decrease due to an abrasion of the ball screw, for example, a change of rigidity of the coupling due to a deformation of a leaf spring can cause a failure of the feed axis that affects the resonance frequency. Consequently, with the conventional failure diagnostic method as in JP 2016-34224 A and JP 2019-105317 A described above, it is difficult to identify in which portion the failure has occurred, namely, a detailed cause of the failure in a failure where the resonance frequency changes.

It is an object of the disclosure to solve problems in the failure diagnostic method of the conventional feed axis mechanism as in JP 2016-34224 A and JP 2019-105317 A. Specifically, it is an object of the disclosure to provide an abnormality diagnostic device that can promptly detect occurrence of the abnormality, in a feed axis mechanism moving a moving body in an axial direction by transmitting a rotation of a servomotor to a ball screw via a coupling. Further, it is also an object of the disclosure to provide an abnormality diagnostic device that can accurately identify an abnormality portion, namely, a detailed cause of the abnormality.

SUMMARY

In order to achieve the above-described object, there is provided an abnormality diagnostic device for a feed axis mechanism according to a first aspect of the disclosure. The abnormality diagnostic device diagnoses an abnormality occurrence and an abnormal portion of the feed axis mechanism. The feed axis mechanism transmits a rotation of a motor to a ball screw coupled by a coupling to rotate the ball screw. The abnormality diagnostic device includes a resonance frequency measuring unit and a diagnosis unit. The resonance frequency measuring unit measures a resonance frequency at a plurality of stroke positions within a stroke range of the feed axis mechanism. The diagnosis unit identifies the abnormal portion based on a relationship between the stroke positions and change amounts relative to a standard value of the measured respective resonance frequencies.

According to a second aspect of the disclosure, in the first aspect of the disclosure, when the change amount relative to the standard value of at least one of the resonance frequencies measured at two stroke positions exceeds a preset abnormality existence determination threshold, the diagnosis unit determines that there is an abnormality in the feed axis mechanism. Exceeding the preset abnormality existence determination threshold is a case that the change amount relative to the standard value of the resonance frequency is larger than the threshold or a case that the change amount relative to the standard value of the resonance frequency is equal to or larger than the threshold. Then, when the abnormality is determined to be in the feed axis mechanism, the diagnosis unit obtains a difference between the change amount relative to the standard value of the resonance frequency measured at the stroke position on a coupling joining side, and the change amount relative to the standard value of the resonance frequency measured at the stroke position on a counter coupling joining side. After that, the diagnosis unit diagnoses as the abnormality of the coupling when the difference exceeds a preset abnormal portion identification threshold and diagnoses as the abnormality of the ball screw in any other case.

According to a third aspect of the disclosure, in the first aspect of the disclosure, when the change amount relative to the standard value of at least one of the resonance frequencies measured at a plurality of stroke positions exceeds the preset abnormality existence determination threshold, the diagnosis unit determines that there is the abnormality in the feed axis mechanism. Exceeding the preset abnormality existence determination threshold is a case that when the change amount relative to the standard value of the resonance frequency is larger than the threshold or a case that the change amount relative to the standard value of the resonance frequency is equal to or larger than the threshold. Then, the diagnosis unit approximates the change amounts relative to the standard value of the measured resonance frequencies at the respective stroke positions by a mathematical formula and identifies the abnormal portion using the mathematical formula as an approximation formula.

According to a fourth aspect of the disclosure, in the third aspect of the disclosure, the diagnosis unit uses a first-order linear approximation formula as the approximation formula, and based on a comparison result between a coefficient in the first-order linear approximation formula and the preset abnormal location identification threshold, and an installation position relative to the stroke position of the coupling. The diagnosis unit diagnoses whether it is the abnormality of a screw shaft, it is the abnormality of the coupling, or it is the abnormality of a nut portion or a rolling body of the ball screw.

That is, the disclosure according to the fourth aspect of the disclosure includes the following disclosure and the like. When the coupling is on a plus side of the stroke position, and the coefficient exceeds the abnormal location identification threshold, in other words, when the coefficient is larger than the threshold, or when the coefficient is equal to or more than the threshold, the disclosure diagnoses as the abnormality of the coupling. When the coefficient is lower than the abnormal location identification threshold, in other words, when the coefficient is smaller than the threshold, or when the coefficient is equal to or less than the abnormal location identification threshold, the disclosure diagnoses as the abnormality of the ball screw due to the nut portion or the rolling body of the ball screw. When the coupling is on a minus side of the stroke position, and the coefficient is lower than the abnormal location identification threshold, in other words, when the coefficient is smaller than the threshold, or when the coefficient is equal to or less than the threshold, the disclosure diagnoses as the abnormality of the coupling. When the coefficient exceeds the abnormal location identification threshold, in other words, when the coefficient is larger than the threshold, or when the coefficient is equal to or more than the threshold, the disclosure diagnoses as the abnormality of the ball screw due to the nut portion or the rolling body of the ball screw.

According to a fifth aspect of the disclosure, in the third aspect of the disclosure, the diagnosis unit uses a second-order approximation formula as the approximation formula. The diagnosis unit diagnoses as the abnormality due to a local abrasion of a screw shaft when a coefficient of the second-order approximation formula becomes negative. Further, when the stroke position as an apex (an uppermost point) of the second-order approximation formula is on a coupling side relative to a center of the stroke, the diagnosis unit diagnoses as the abnormality of a nut portion or a rolling body of the ball screw. Moreover, when the stroke position as the apex (the uppermost point) of the second-order approximation formula is on an opposite side of the coupling relative to the center of the stroke, the diagnosis unit diagnoses as the abnormality of the coupling.

The feed axis mechanism moves the moving body in the axial direction by transmitting the rotation of the servomotor to the ball screw via the coupling. In the feed axis mechanism, the abnormality diagnostic device of the feed axis mechanism (hereinafter simply referred to as the abnormality diagnostic device) according to the first aspect of the disclosure can promptly detect the abnormality occurrence and accurately identify the portion where the cause of the abnormality occurs.

The abnormality diagnostic device according to the second aspect of the disclosure can very accurately identify whether the abnormal portion is the coupling or the ball screw.

The abnormality diagnostic device according to the third to fifth aspects of the disclosure can very accurately identify whether the abnormal portion is the coupling, the nut portion or the rolling body of the ball screw, or the screw shaft.

DETAILED DESCRIPTION

The following describes one embodiment of an abnormality diagnostic device according to the disclosure based on the drawings.

First embodiment of the invention is described below.

At the beginning, the constitution of feed axis mechanism and abnormality diagnostic device of first embodiment is described.

Figure 1:
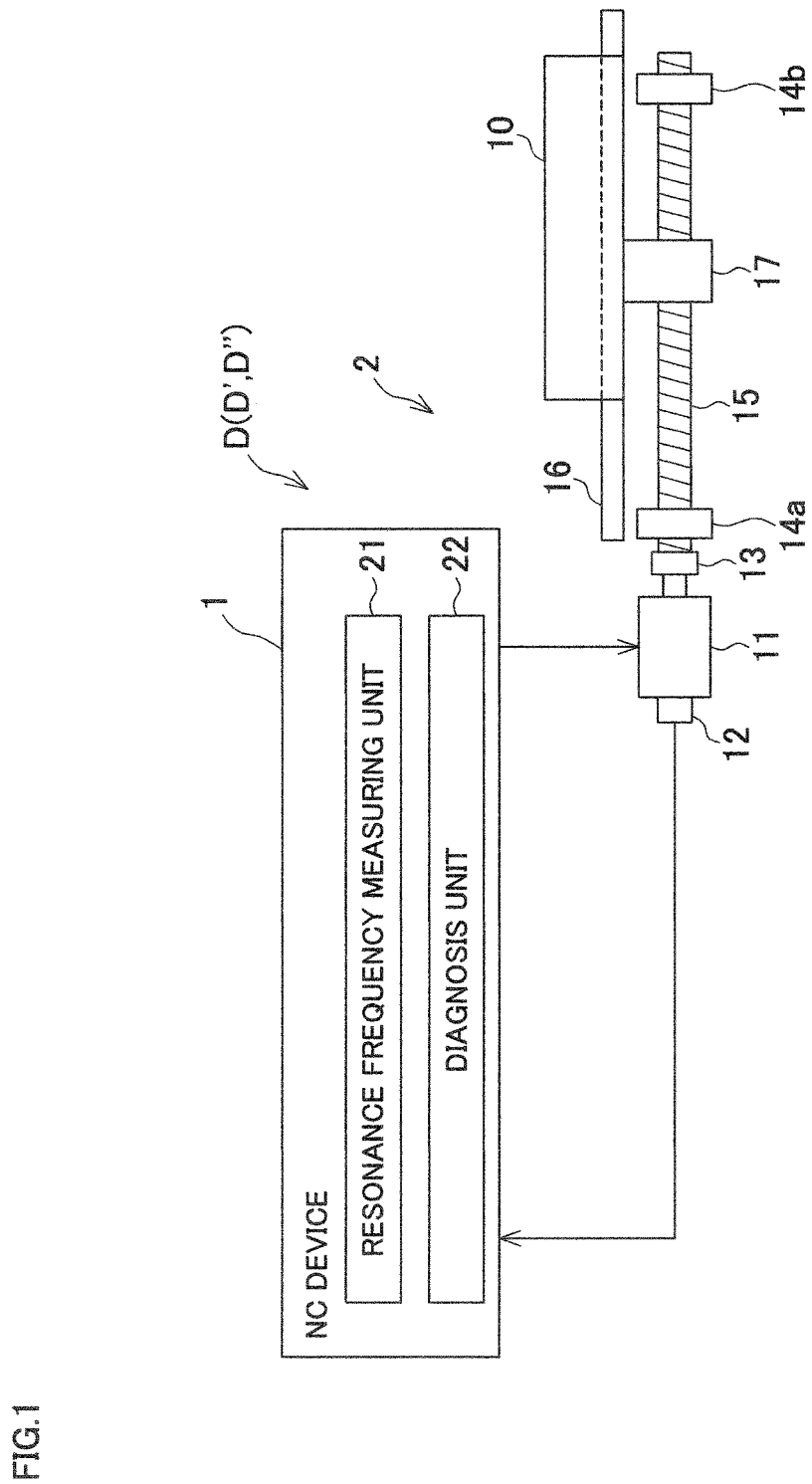
FIG. 1 is an explanatory view illustrating an exemplary constitution of a feed axis mechanism where an abnormality diagnostic device is applied.

FIG. 1 illustrates one example of the feed axis mechanism where the abnormality diagnostic device according to the disclosure is located. A feed axis mechanism 2 is constituted of a ball screw 15, support bearings 14a, 14b, a servomotor 11, a coupling 13, a guide device 16, a moving body 10, a feed axis main body including a nut portion 17, and an NC device 1 (a position controller) for controlling an operation of the feed axis main body.

In the feed axis mechanism 2, the support bearings 14a, 14b are secured to a base (not illustrated), and the ball screw 15 is rotatably held by the support bearings 14a, 14b. The ball screw 15 is joined to a shaft member of the servomotor 11 that is a driving device via the coupling 13. In the servomotor 11, a position detector 12 for detecting a position of the moving body 10 in an axial direction of the ball screw 15 is located, and the servomotor 11 is coupled to the NC device 1.

In the NC device 1, a resonance frequency measuring unit 21 for measuring a resonance frequency, and a diagnosis unit 22 for diagnosing an abnormality of the operation. The NC device 1 includes a storage unit constituted of a RAM, a ROM, and the like, a timer, and the like, and is in a state of being coupled to a display unit, such as a monitor, and an input unit, such as numeric keypads via an interface. Incidentally, in FIG. 1, the description of each component of the NC device 1 is omitted. The NC device 1 constitutes an abnormality diagnostic device D for diagnosing the abnormality of the feed axis mechanism 2 by collaborating with the servomotor 11 and the position detector 12.

The nut portion 17 is in a state of being movably screwed between the support bearings 14a, 14b in front and rear of the ball screw 15, and the moving body 10 is secured on an upper portion of the nut portion 17. The guide device 16, such as a rail, is located along a longitudinal direction of the ball screw 15 above the ball screw 15, and a lower surface of the moving body 10 is in a state of being slidably engaged to the guide device 16.

In the above-described feed axis mechanism 2, the servomotor 11 operates by a command generated by the NC device 1 being transmitted. Then, the ball screw 15 rotates by a predetermined amount, and thus, the moving body 10 secured to the nut portion 17 is translated with a guide by the guide device 16 along the axial direction of the ball screw 15. The position detector 12 included in the servomotor 11 detects the position of the moving body 10 based on a rotation amount of the ball screw 15 and feeds back a detection signal to the NC device 1, and thus, a translational operation is controlled.

The abnormality diagnostic method of feed axis mechanism by abnormality diagnostic device of first embodiment is described below.

Next, a description will be given of the abnormality diagnostic method of the feed axis mechanism 2 by the abnormality diagnostic device D. In performing the abnormality diagnosis of the feed axis mechanism 2 by the abnormality diagnostic device D, the resonance frequency is measured at a plurality of positions inside a stroke operation range of the feed axis mechanism 2, by the resonance frequency measuring unit 21. The stroke operation range is a range from the position where the moving body 10 is closest to the support bearing 14a to the position where the moving body 10 is farthest from the support bearing 14a. That is, by the command of the NC device 1, a control signal of sine wave swept in a predetermined frequency range is input into the servomotor 11 as a disturbance. Then, at the time of the input, a frequency response is calculated by using a signal detected by the position detector 12 and an input waveform. Moreover, the frequency at which a gain of the calculated frequency response becomes a maximum is detected as the resonance frequency. When the resonance frequency is detected as described above, the abnormality diagnostic device D identifies the abnormal portion (a failure portion) by various methods, based on a relationship between a measured stroke position and a reduction amount of the resonance frequency relative to a standard value. The standard value, which will be described later, is preliminarily stored in the storage unit of the NC device 1.

In the feed axis mechanism 2 as illustrated in FIG. 1, the resonance frequency of a feed axis system varies under the influence of all the components constituting the feed axis system. The components constituting the feed axis system includes a joining portion between the moving body 10 and the nut portion 17 of the ball screw 15, the screw shaft of the ball screw 15, the support bearings 14a, 14b supporting both ends of the ball screw 15, the coupling 13, and the like. In the feed axis mechanism 2 as in FIG. 1, the abnormality (the failure) occurs by a decrease in rigidity of the nut portion 17 of the ball screw 15 due to an abrasion or damage of the ball screw 15 or a change in rigidity of the coupling 13 due to a defamation of a leaf spring of the coupling 13.

Figure 2:
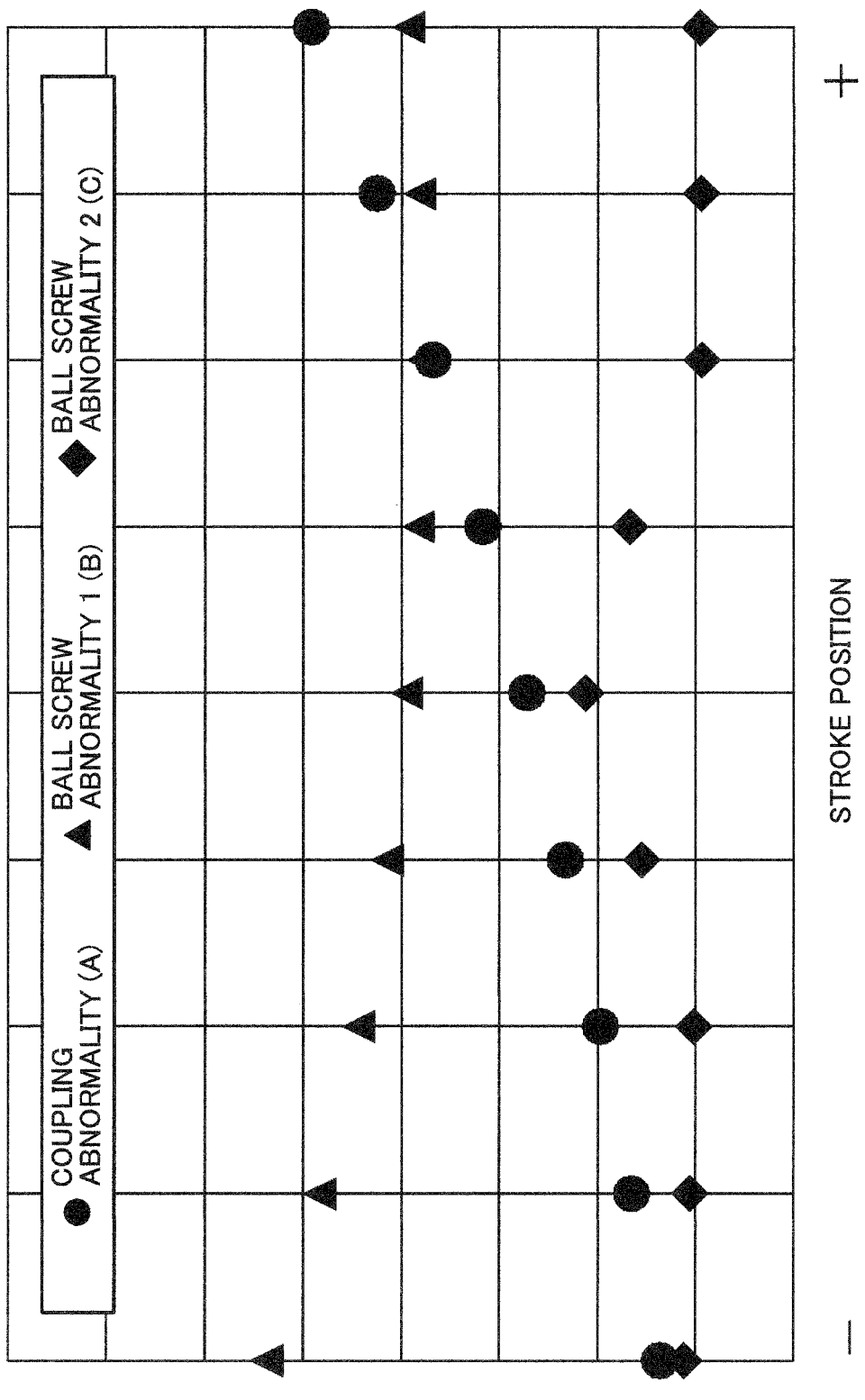
FIG. 2 is an explanatory view illustrating a state (one example) of a change of a resonance frequency due to a failure portion of the feed axis mechanism.

FIG. 2 illustrates a state (one example) where the resonance frequency changes at the stroke position when the abnormality occurs in the feed axis mechanism 2 having a structure as illustrated in FIG. 1. The screw shaft of the ball screw 15 is divided into both sides, specifically, a plus side and a minus side of the stroke by the position of the nut portion 17, and the resonance frequency changes at the position of the nut portion 17 namely, the stroke position. Thus, depending on the position of the nut portion 17, an influence degree on the change in the resonance frequency of each component, which constitutes the portions of both sides of the stroke, changes.

Then, as illustrated as a case of A in FIG. 2, when the coupling 13 is on the plus side of the stroke and there is the abnormality in the coupling 13, a change amount of the resonance frequency on the plus side become significantly increases. As illustrated as a case of B in FIG. 2, when there is the abnormality in the ball screw 15, and the nut portion 17 or a rolling body is mainly abraded, the reduction amount of the resonance frequency from the resonance frequency in a normal case becomes a change as indicated in a ball screw abnormality 1. On the other hand, as illustrated as a case of C in FIG. 2, when the screw shaft is locally abraded, the reduction amount of the resonance frequency from the resonance frequency in the normal case becomes a change as indicated in a ball screw abnormality 2. The abnormality diagnosis of the feed axis mechanism 2 by the abnormality diagnostic device D detects the occurrence of the abnormality in the feed axis mechanism 2 and identifies the abnormal portion based on the change in the reduction amount of the resonance frequency at each stroke position as described above.

Figure 3:
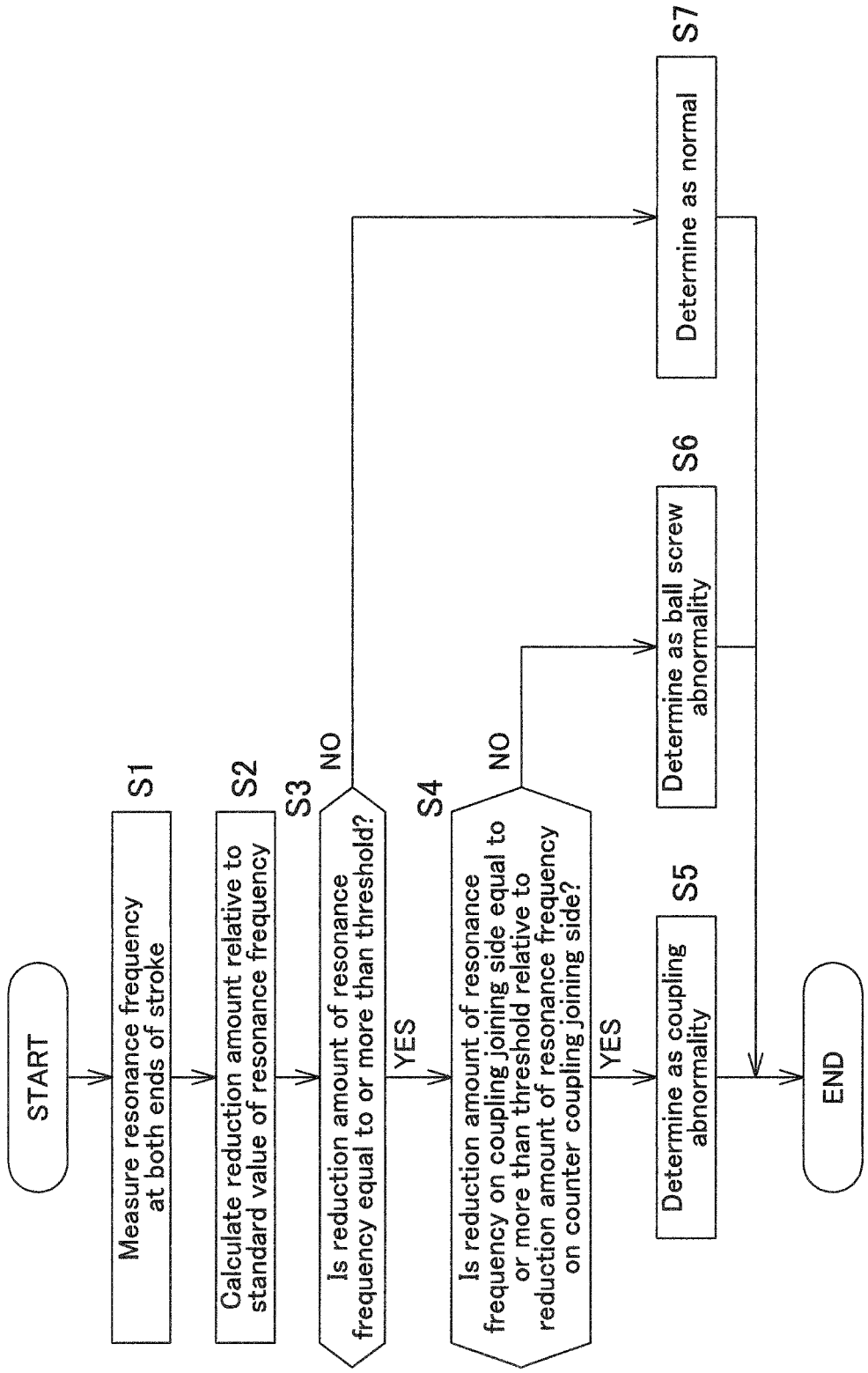
FIG. 3 is a flowchart illustrating a procedure of an abnormality diagnosis by the abnormality diagnostic device.

The following describes a specific procedure of the abnormality diagnosis by the abnormality diagnostic device D based on a flowchart in FIG. 3.

In executing the abnormality diagnosis by the abnormality diagnostic device D, first, at Step (hereinafter simply indicated by S1), the respective resonance frequencies are measured at two points on both side of the stroke by the resonance frequency measuring unit 21 (S1). Then, at subsequent S2, the reduction amounts from the standard value, which is preliminarily set (stored), are calculated for the measured respective resonance frequencies (S2). In the storage unit of the NC device 1, the resonance frequency measured immediately after assembly of the feed axis mechanism 2 is preliminarily stored as the standard value, which is regarded as a normal value of the resonance frequency.

After calculating the reduction amounts from the standard value of the respective resonance frequencies at S2, at subsequent S3, it is determined whether or not any of the reduction amounts of the respective resonance frequencies on both sides of the strokes is equal to or more than an abnormality existence determination threshold that is preliminarily stored in the storage unit of the NC device 1. When it is determined that any of the reduction amounts of the respective resonance frequencies is equal to or more than the abnormality existence determination threshold, "YES" is selected at S3. Then, S4 that is for identifying the abnormal portion is executed assuming existence of the abnormality in the feed axis system.

At S4, the reduction amount of the resonance frequency on a coupling joining side which is a side close to the coupling 13, and the reduction amount of the resonance frequency on a counter coupling joining side which is a side far from the coupling 13 are compared. Then, it is determined whether or not the reduction amount on the coupling joining side is equal to or more than an abnormal portion identification threshold, compared with the reduction amount on the counter coupling joining side. Then, when it is determined that the reduction amount on the coupling joining side is equal to or more than the abnormal portion identification threshold, compared with the reduction amount on the counter coupling joining side, "YES" is selected at S4 and S5 is executed. At S5, it is assumed that the abnormality has occurred due to the influence of the coupling 13, and the fact is displayed on the display unit of the NC device 1.

On the other hand, when it is determined that both the reduction amounts of the respective resonance frequencies are less than the abnormality existence determination threshold, "NO" is selected at S3 and it is determined that the feed axis mechanism 2 is normal, and the fact is displayed on the display unit of the NC device 1. When it is determined that the reduction amount on the counter coupling joining side is larger than the reduction amount on the coupling joining side, or a difference between the reduction amount on the coupling joining side and the reduction amount on the counter coupling joining side is less than the abnormal portion identification threshold, "NO" is selected at S4. Then, S6 is executed. At S6, it is assumed that the abnormality has occurred due to the influence of the ball screw 15, and the fact is displayed on the display unit of the NC device 1.

Effect of the abnormality diagnostic device of first embodiment is described below.

As described above, the abnormality diagnostic device D measures the resonance frequency at two points within the stroke range of the feed axis mechanism 2 and identifies the abnormal portion based on the relationship between the stroke positions and the change amounts relative to the standard value of the measured respective resonance frequencies. Thus, the abnormality diagnostic device D can promptly detect the occurrence of the abnormality and identify the portion where the cause of the abnormality occurs.

As described above, when the change amount relative to the standard value of one of the two measured resonance frequencies exceeds the abnormality existence determination threshold, the abnormality diagnostic device D determines that there is the abnormality in the feed axis mechanism 2. Then, the abnormality diagnostic device D obtains a difference between the change amount relative to the standard value of the resonance frequency measured at the stroke position on the coupling joining side and the change amount relative to the standard value of the resonance frequency measured at the stroke position on the counter coupling joining side. When the difference exceeds the abnormal portion identification threshold, the abnormality diagnostic device D diagnoses that the coupling 13 is abnormal and, in other cases, diagnoses that the ball screw 15 is abnormal. Therefore, according to the abnormality diagnostic device D, it is possible to very accurately identify whether the abnormal portion is the coupling 13 or the ball screw 15.

Second embodiment of the invention is described below.

A structure an abnormality diagnostic device D' of the second embodiment is similar to that of the abnormality diagnostic device D of the first embodiment. However, the abnormality diagnostic device D' of the second embodiment measures the respective resonance frequencies at a plurality of positions which are equally spaced within the stroke by the resonance frequency measuring unit 21. After that, as illustrated in FIG. 4, the abnormality diagnostic device D' performs a first-order linear approximation to the measured change amounts relative to the standard value of the resonance frequencies at the respective stroke positions by a method such as a least square method to obtain a first-order linear approximation formula ($y=ax+b$).

Figure 4:
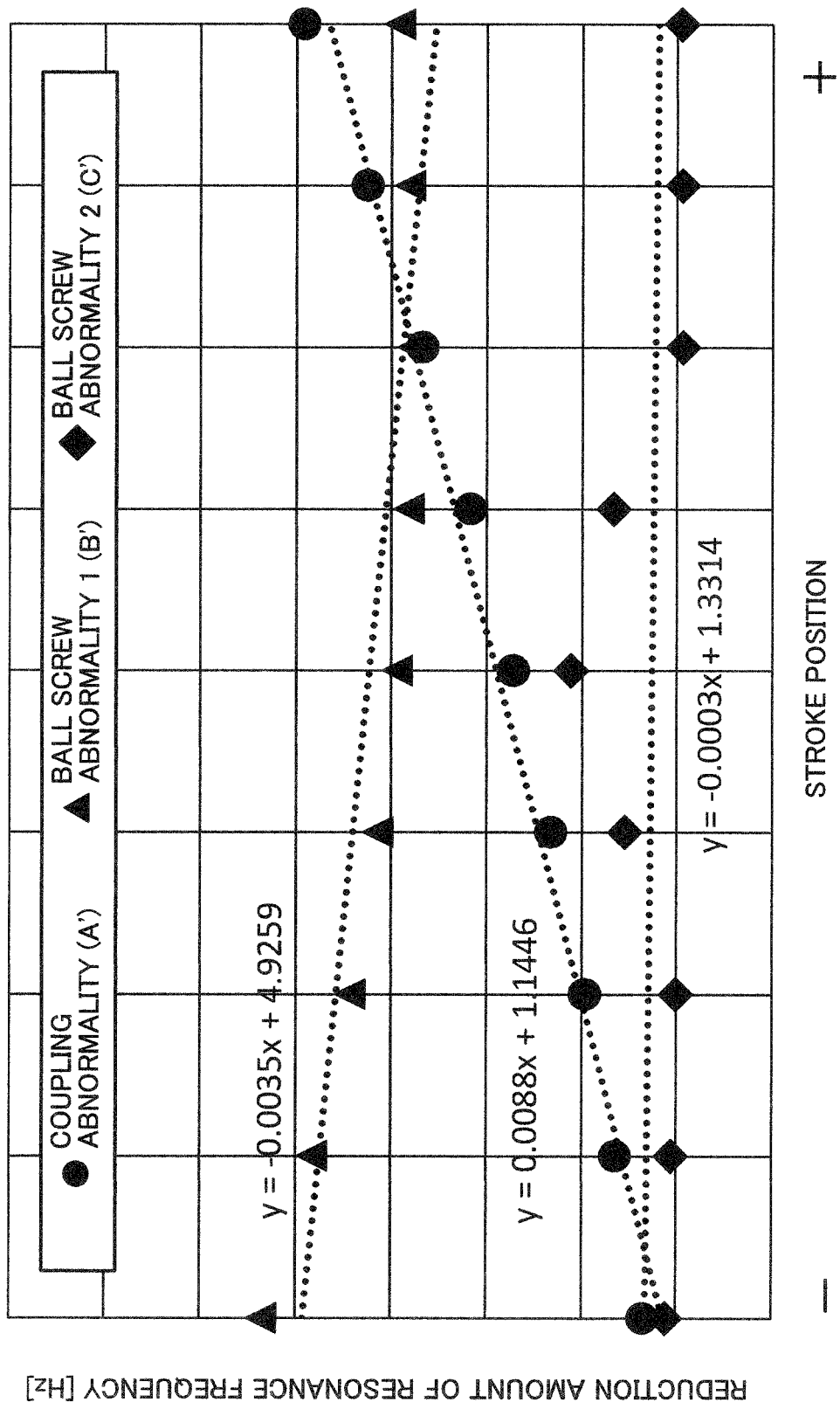
FIG. 4 is an explanatory view illustrating a state (one example) where the change of the resonance frequency due to the failure portion of the feed axis mechanism is linearly approximated.

Then, when an absolute value of the coefficient (a) is equal or less than abnormal location identification threshold that is preliminarily stored in the storage unit of the NC device 1, for example, a case C' in FIG. 4, the abnormality diagnostic device D' diagnoses as the abnormality due to a local abrasion of the screw shaft of the ball screw 15.

In the feed axis mechanism 2, the coupling 13 is positioned on the minus side of the stroke position. Thus, when the coefficient (a) is larger than the abnormal location identification threshold, for example, a case A' in FIG. 4, the abnormality diagnostic device D' diagnoses as the abnormality of the coupling 13. In other case, namely, when the coefficient (a) is a negative numerical value, and the absolute value is larger than the abnormal location identification threshold, for example, a case B' in FIG. 4, the abnormality diagnostic device D' diagnoses as the abnormality mainly due to the nut portion 17 or the rolling body of the ball screw 15.

When the abnormality diagnostic device D° is mounted to a feed axis mechanism 2 where a coupling 13 is positioned on the plus side of the stroke position, and the coefficient (a) exceeds the abnormal location identification threshold, the abnormality diagnostic device D' can diagnose as the abnormality mainly due to a nut portion 17 or the rolling body of a ball screw 15. In other cases, the abnormality diagnostic device D' can diagnose as the abnormality of the coupling 13.

As described above, the abnormality diagnostic device D' of the second embodiment approximates the change amounts relative to the standard value of the measured resonance frequencies at the respective stroke positions by a mathematical formula. The abnormality diagnostic device D' uses the first-order linear approximation formula as the approximation formula. The abnormality diagnostic device D' identifies the abnormal portion based on a comparison result between the coefficient in the first-order linear approximation formula and the preset abnormal location identification threshold, and an installation position of the coupling 13 relative to the stroke position. Therefore, the abnormality diagnostic device D' can very accurately identify whether the abnormal portion is the coupling 13 or the nut portion 17 of the ball screw 15 or the screw shaft.

Third embodiment of the invention is described below.

A structure of an abnormality diagnostic device D" of the third embodiment is similar to that of the abnormality diagnostic device D of the first embodiment. However, the abnormality diagnostic device D" of the third embodiment, similarly to the abnormality diagnostic device D' of the second embodiment, measures the respective resonance frequencies at the plurality of positions which are equally spaced within the stroke by the resonance frequency measuring unit 21. After measurement, as illustrated in FIG. 5, the abnormality diagnostic device D" performs a second-order approximation to the change amounts relative to the standard value of the resonance frequencies at the measured respective stroke positions by a method such as a least square method to obtain a second-order approximation formula ($y=px^2+qx+r$).

Figure 5:
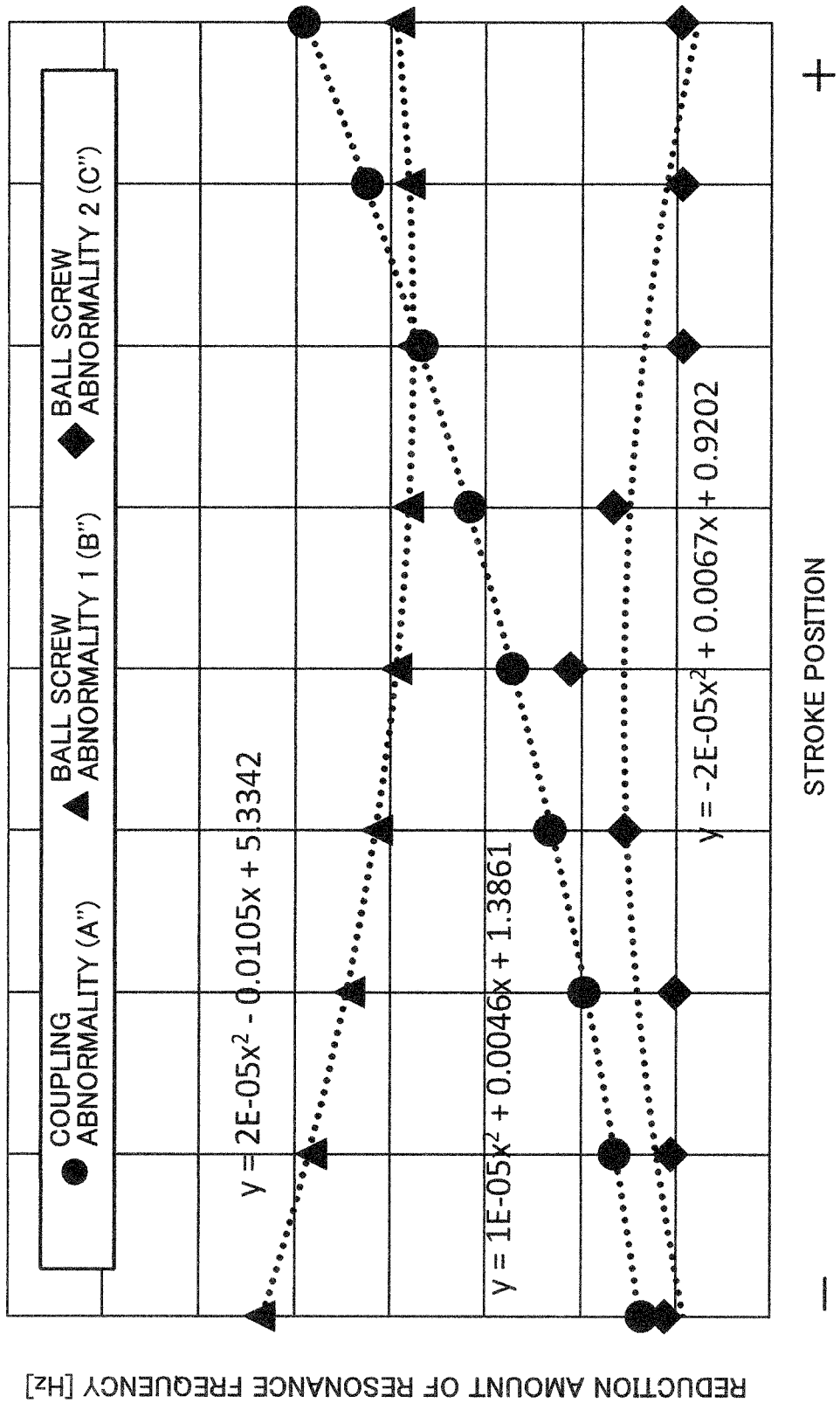
FIG. 5 is an explanatory view illustrating a state (one example) where the change of the resonance frequency due to the failure portion of the feed axis mechanism is approximated by a quadratic.

Then, when the coefficient (p) in the second-order approximation formula is negative, for example, as illustrated as a case C" in FIG. 5, the abnormality diagnostic device D" diagnoses as the abnormality due to the local abrasion of the screw shaft of the ball screw 15. On the other hand, when the coefficient (p) in the second-order approximation formula is positive, for example, as illustrated as a case A" or B" in FIG. 5, the abnormality diagnostic device D" diagnoses as the abnormality of the coupling 13.

Furthermore, when the coefficient (p) in the second-order approximation formula is negative, and the stroke position as an apex (an uppermost point) of the quadratic is on the installation side of the coupling 13 relative to a center of the stroke, the abnormality diagnostic device D" diagnoses as the abnormality mainly due to the nut portion 17 or the rolling body of the ball screw 15. When the coefficient (p) in the second-order approximation formula is negative, and the stroke position as the apex (the uppermost point) of the quadratic is on the counter coupling side, namely, the opposite side to the installation side of the coupling 13 relative to the center of the stroke, the abnormality diagnostic device D" diagnoses as the abnormality as the coupling 13.

As described above, the abnormality diagnostic device D" of the third embodiment approximates the change amounts relative to the standard value of the measured resonance frequencies at the respective stroke positions by a mathematical formula and uses the second-order approximation formula as the approximation formula. When the coefficient in the second-order approximation formula is negative, the abnormality diagnostic device D" diagnoses as the abnormality due to the local abrasion of the screw shaft. When the stroke position as the apex of the second-order approximation formula is on the coupling 13 side relative to the center of the stroke, the abnormality diagnostic device D" diagnoses as the abnormality of the nut portion 17 or the rolling body of the ball screw 15. When the stroke position as the apex of the second-order approximation formula is on the opposite side of the coupling 13 relative to the center of the stroke, the abnormality diagnostic device D" diagnoses as the abnormality of the coupling 13. Therefore, the abnormality diagnostic device D" of the third embodiment can very accurately identify whether the abnormal portion is the coupling 13 or the nut portion 17 or the rolling body of the ball screw 15 or the screw shaft.

Modification example of abnormality diagnostic device is described below.

The abnormality diagnostic device according to the disclosure is not limited to the aspects of the above-described embodiments. The configuration of the NC device including the resonance frequency measuring unit, the diagnosis unit, the servomotor, the position detector, and the like, can be appropriately changed as necessary without departing from the subject matter of the disclosure. Further, the configuration of the feed axis mechanism where the abnormality diagnostic device according to the disclosure is mounted is not limited to the aspects of the above-described embodiments. The configuration of the ball screw, the support bearings, the servomotor, the coupling, the guide device, the moving body, the nut portion, and the like can be appropriately changed as necessary.

For example, as the above-described embodiments, the abnormality diagnostic device according to the disclosure is not limited to one described as follows. The abnormality diagnostic device inputs a control signal of a sine wave sweep in a predetermined frequency range into the servomotor as a disturbance. Then, the abnormality diagnostic device obtains the resonance frequency by detecting the frequency where the gain of the frequency response calculated using the signal and the input waveform detected by the position detector at the time of input becomes a maximum. The abnormality diagnostic device may be the one that obtains the resonance frequency by other methods. As the above-described embodiments, the abnormality diagnostic device according to the disclosure is not limited to the one that sets the resonance frequency measured immediately after the assembly to the standard value, which is regarded as the normal value of the resonance frequency. It is possible to change the abnormality diagnostic device to the one that sets an average value of the resonance frequencies measured in a plurality of feed axis mechanisms of an identical type to the standard value of the resonance frequencies, or the like. Furthermore, As the above-described embodiments, the abnormality diagnostic device according to the disclosure is not limited to the one that approximates the change amounts relative to the standard value of the measured resonance frequencies at the respective stroke positions by the first-order or second-order mathematical formula, or the like, using the least square method. The abnormality diagnostic device may be the one that approximates the change amounts relative to the standard value of the measured resonance frequencies at the respective stroke positions by the first-order or second-order mathematical formula, or the like, using other mathematical methods.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An abnormality diagnostic device for a feed axis mechanism diagnosing an abnormality occurrence and an abnormal portion of the feed axis mechanism, the feed axis mechanism transmitting a rotation of a motor to a ball screw coupled by a coupling to rotate the ball screw, the abnormality diagnostic device comprising:

a resonance frequency measuring unit that measures a resonance frequency at a plurality of stroke positions within a stroke range of the feed axis mechanism; and a diagnosis unit that identifies the abnormal portion based on a relationship between the stroke positions and change amounts relative to a standard value of the measured respective resonance frequencies; and wherein when the change amount relative to the standard value of at least one of the resonance frequencies measured at two stroke positions exceeds a preset abnormality existence determination threshold, the diagnosis unit determines that there is an abnormality in the feed axis mechanism, and when the abnormally is determined to be in the feed axis mechanism, the diagnosis unit obtains a difference between the change amount relative to the standard value of the resonance frequency measured at the stroke position on a coupling joining side and the change amount relative to the standard value of the resonance frequency measured at the stroke position on a counter coupling joining side, and the diagnosis unit diagnoses the abnormality in the feed axis mechanism as an abnormality of the coupling when the difference exceeds a preset abnormal portion identification threshold, and diagnoses as the abnormality in the feed axis mechanism as an abnormality of the ball screw when the difference is less than or equal to the preset abnormal identification threshold.

2. The abnormality diagnostic device for a feed axis mechanism according to claim 1, wherein when the change amount relative to the standard value of at least one of the resonance frequencies measured at a plurality of stroke positions exceeds the preset abnormality existence determination threshold, the diagnosis unit determines that there is the abnormality in the feed axis mechanism, and the diagnosis unit approximates the change amounts relative to the standard value of the measured resonance frequencies at the respective stroke positions by a mathematical formula and identifies the abnormal portion using the mathematical formula as an approximation formula.

3. The abnormality diagnostic device for the feed axis mechanism according to claim 2, wherein
the diagnosis unit uses a first-order linear approximation formula as the approximation formula, and
based on a comparison result between a coefficient in the first-order linear approximation formula and the preset abnormal location identification threshold, and an installation position relative to the stroke position of the coupling, the diagnosis unit diagnoses whether an abnormality in the feed axis mechanism is an abnormality of a screw shaft, an abnormality of the coupling, or an abnormality of a nut portion or a rolling body of the ball screw.

4. The abnormality diagnostic device for the feed axis mechanism according to claim 2, wherein
the diagnosis unit uses a second-order approximation formula as the approximation formula and diagnoses an abnormality in the teed axis mechanism as an abnormality due to a local abrasion of a screw shaft when a coefficient of the second-order approximation formula becomes negative,
when the stroke position having the maximum value in the second-order approximation formula is on a coupling side relative to a center of the stroke, the diagnosis unit diagnoses an abnormality in the axis mechanism as an abnormality of a nut portion or a rolling body of the ball screw, and
when the stroke position as the apex of the second-order approximation formula is on an opposite side of the coupling relative to the center of the stroke, the diagnosis unit diagnoses an abnormality in the feed axis mechanism as an abnormality of the coupling.

* * * * *